(12) United States Patent
Hino

(10) Patent No.: US 8,562,023 B2
(45) Date of Patent: *Oct. 22, 2013

(54) VEHICLE WITH PNEUMATIC TIRE AND METHOD FOR COOLING TIRE IN THE VEHICLE

(75) Inventor: Hidehiko Hino, Hyogo (JP)

(73) Assignee: Sumitomo Rubber Industries, Ltd., Kobe (JP)

( * ) Notice: Subject to any disclaimer, the term of this patent is extended or adjusted under 35 U.S.C. 154(b) by 133 days.

This patent is subject to a terminal disclaimer.

(21) Appl. No.: 13/128,646

(22) PCT Filed: Nov. 5, 2009

(86) PCT No.: PCT/JP2009/068897
§ 371 (c)(1),
(2), (4) Date: May 11, 2011

(87) PCT Pub. No.: WO2010/055803
PCT Pub. Date: May 20, 2010

(65) Prior Publication Data
US 2011/0220325 A1    Sep. 15, 2011

(30) Foreign Application Priority Data

Nov. 12, 2008  (JP) ................. 2008-290241
Nov. 13, 2008  (JP) ................. 2008-291223

(51) Int. Cl.
*B60C 23/19*    (2006.01)
*F28D 15/00*    (2006.01)

(52) U.S. Cl.
USPC ......... 280/855; 165/41; 165/104.19; 301/6.3; 188/71.6; 188/264 A

(58) Field of Classification Search
USPC .............. 280/855, 727; 153/153; 165/104.19, 165/104.11, 104.34, 41; 301/6.3; 152/153; 188/264 R, 264 A, 264 AA, 264 B, 264 D, 188/264 E, 264 F, 71.6
See application file for complete search history.

(56) References Cited

U.S. PATENT DOCUMENTS 2,540,043 A * 1/1951 Crooker ................... 152/153
3,256,920 A * 6/1966 Byers ....................... 152/208
(Continued)

FOREIGN PATENT DOCUMENTS

JP    54-13103      1/1979
JP    5-8620 A      1/1993
(Continued)

OTHER PUBLICATIONS

International Search Report, dated Feb. 16, 2010, issued in PCT/JP2009/068897.

(Continued)

*Primary Examiner* — Drew Brown
(74) *Attorney, Agent, or Firm* — Birch, Stewart, Kolasch & Birch, LLP

(57) ABSTRACT

The first invention relates to a vehicle with pneumatic tires characterized in that the vehicle comprises a cooling unit which expels a fluid to cool the pneumatic tire from the outside thereof at least when the air pressure of the pneumatic tire decreases. And, the second invention relates to a tire cooling method in the vehicle with pneumatic tires comprising: a step of monitoring the air pressure of the pneumatic tire during running, and a step of expelling a fluid toward the pneumatic tire so as to cool the pneumatic tire from its outside when the air pressure falls below a predetermined value.

4 Claims, 14 Drawing Sheets

(56) References Cited

U.S. PATENT DOCUMENTS

| | | | | |
|---|---|---|---|---|
| 4,343,338 A | * | 8/1982 | Hart | 152/153 |
| 4,480,669 A | * | 11/1984 | Skidmore | 152/153 |
| 4,771,822 A | * | 9/1988 | Barbosa | 165/41 |
| 2009/0222165 A1 | * | 9/2009 | Krause et al. | 701/36 |
| 2011/0073228 A1 | * | 3/2011 | Hill et al. | 152/153 |
| 2011/0220325 A1 | * | 9/2011 | Hino | 165/104.19 |
| 2011/0308676 A1 | * | 12/2011 | Morozumi | 152/153 |

FOREIGN PATENT DOCUMENTS

| | | |
|---|---|---|
| JP | 5-24403 U | 3/1993 |
| JP | 6-122360 A | 5/1994 |
| JP | 7-290916 A | 11/1995 |
| JP | 7-329736 A | 12/1995 |
| JP | 3059840 U | 7/1999 |
| JP | 2003-220810 A | 8/2003 |
| JP | 2004-25953 A | 1/2004 |
| JP | 2006-182318 A | 7/2006 |
| JP | 2006-193058 A | 7/2006 |
| JP | 2006-199151 A | 8/2006 |

OTHER PUBLICATIONS

Search Report dated Jun. 27, 2012 of Application No. 09 82 6053.

* cited by examiner

VEHICLE WITH PNEUMATIC TIRE AND METHOD FOR COOLING TIRE IN THE VEHICLE

TECHNICAL FIELD

The present invention relates to a vehicle with pneumatic tires and a method for cooling tires in the vehicle, particularly to technology capable of improving durability during running at low air pressure of pneumatic tire.

BACKGROUND OF THE INVENTION

In a tire, running causes periodical distortion in a rubber portion. A part of the energy thereof is converted into heat, and the tire produces heat. In particular, when the tire keeps running with decreased air pressure, each strain becomes large, and much of heat generates. When a rubber temperature of the tire exceeds a certain value, the rubber fracture begins. Therefore, it is useful in enhancing durability of the tire to keep the temperature of the running tire down.

And, in recent years, a run flat tire is prevalent for the purpose of enhancing convenience and safety and enlarging a vehicle interior space. It is well known that the run flat tire is of a side-reinforced type in which an inside of each sidewall portion is provided with a side reinforcing rubber layer having a substantially crescent cross-sectional shape (see the following patent document 1, for example). In this run flat tire, even at a time of puncture for example, the side reinforcing rubber layer receives a tire load instead of air pressure, and eventually a deflection of the sidewall portion is limited. Therefore, even when the tire is punctured the run flat tire is capable of running ongoingly about from 50 to 100 km at a speed of from 60 to 80 km/h, for example, (hereinafter, such running is so-called "run-flat running").

However, although it is the run flat tire, the side reinforcing rubber layer generates heat in proportion to running distance during the run-flat running with decreased air pressure. And when the running distance becomes over a limiting value, the side reinforcing rubber layer breaks because of heat degradation.

Patent document 1: Japanese unexamined Patent Application Publication No. 2006-182318.

DISCLOSURE OF INVENTION

Problem to be Solved by the Invention

In order to delay a fracture of tire during running with low air pressure including the run-flat running, it is helpful to increase the rigidity of each part of the tire and to decrease the strain. However, in the tire reinforced in such a way, a vertical spring increases in excess, and there are disadvantages of a deterioration of ride comfort and an increase in tire weight.

In view of those facts, objects of the present invention are to provide a vehicle with pneumatic tires and a method for cooling the tires in the vehicle, being capable of repressing the heat generation of the tires and improving the durability during running with low air pressure.

Means of Solving the Problems

According to the first object of the present invention, a vehicle with at least pneumatic tires, is characterized by comprising a cooling unit which expels a fluid to cool the pneumatic tire from the outside thereof when the air pressure of the pneumatic tire decreases.

The second object of the present invention is a tire cooling method in a vehicle with pneumatic tires comprising:
a step of monitoring the air pressure of pneumatic tire during running, and
a step of expelling a fluid toward a pneumatic tire so as to cool the pneumatic tire from its outside when the air pressure falls below a predetermined value.

Effects of the Invention

In the first and second objects of the present invention, the tire during running at low air pressure can be cooled with using a fluid. Therefore, without increasing excessively the vertical spring constants of the tire and the like, the heat generation of the tire during running with low air pressure can be delayed, and eventually the durability can be improved. In particular, when the pneumatic tire is a run flat tire, a running distance of run flat proceeding and/or a speed of run-flat running are pronouncedly increased.

Figure 1:
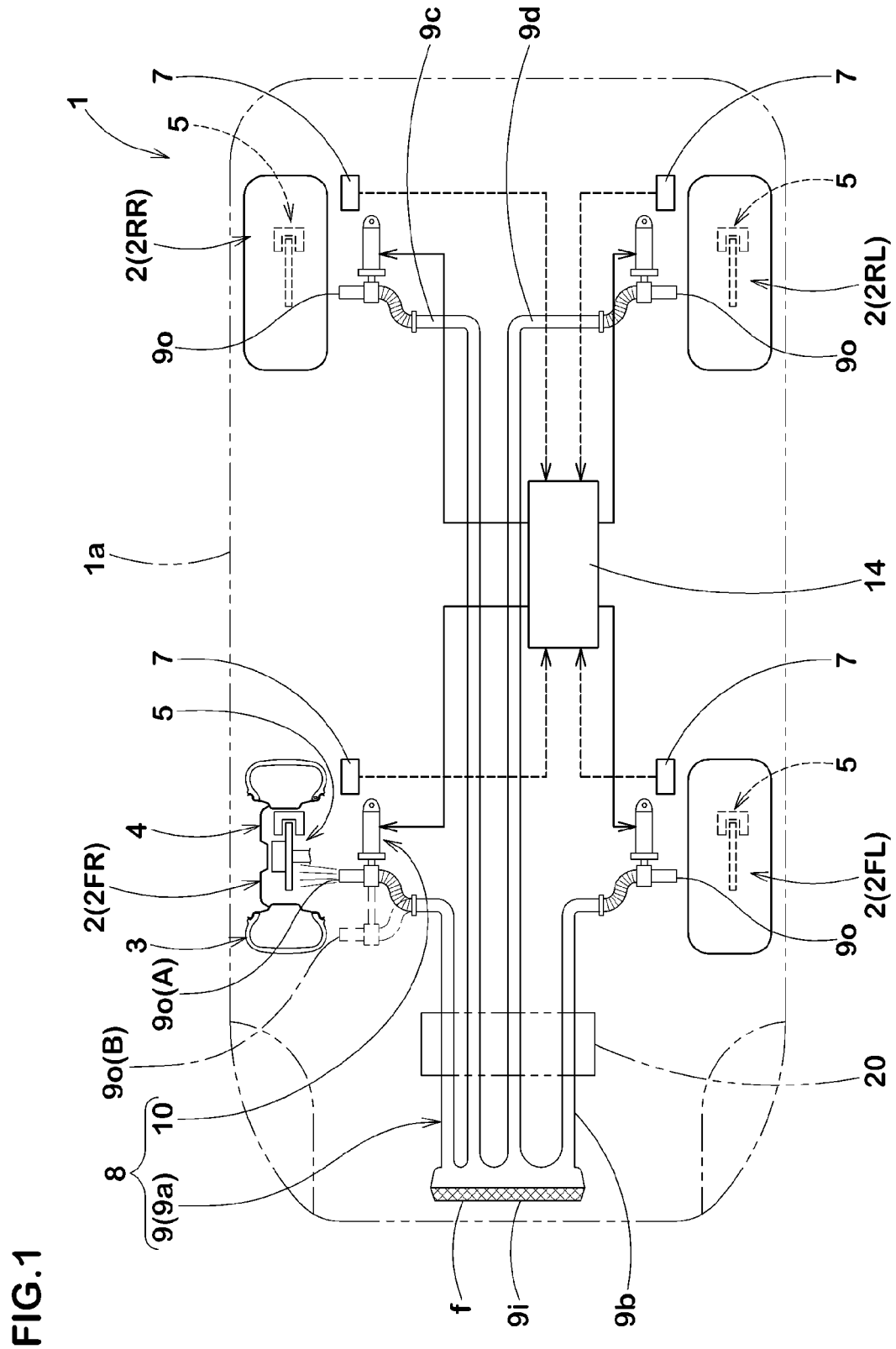
FIG. 1 A planar pattern diagram of a vehicle showing an embodiment of the present invention.

EXPLANATION OF THE REFERENCE 1 vehicle
1a carbody
2, 2FR, 2FL, 2RR, 2RL wheels
3 Pneumatic tire
7 Air pressure monitoring device
8 cooling unit
9 Duct
9 Air intake port
9o Nozzle
10 change-over tool 11 Actuator
14 controlling device
15 changeover valve
23 Flow channel
24 Nozzle
T Tank
P Pump
G Gas
L Liquid

BEST MODE FOR CARRYING OUT THE
INVENTION

Hereinafter, embodiments of the present invention will be described with referent to the drawings.

Embodiment

A Case that the Fluid to Cool the Tire is a Gas

Figure 2:
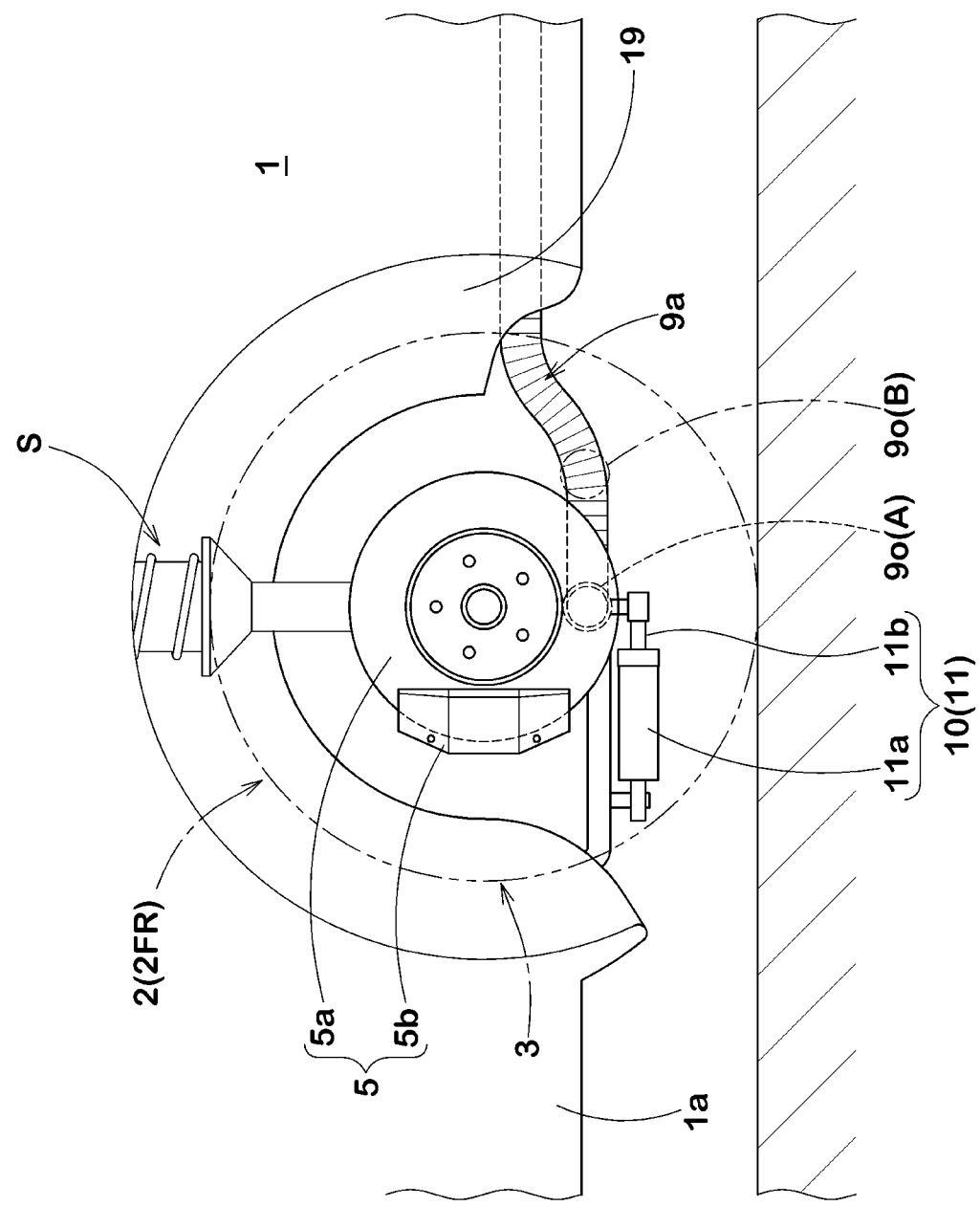
FIG. 2 An enlarged view of a substantial part near the front-right wheel thereof.
Figure 3:
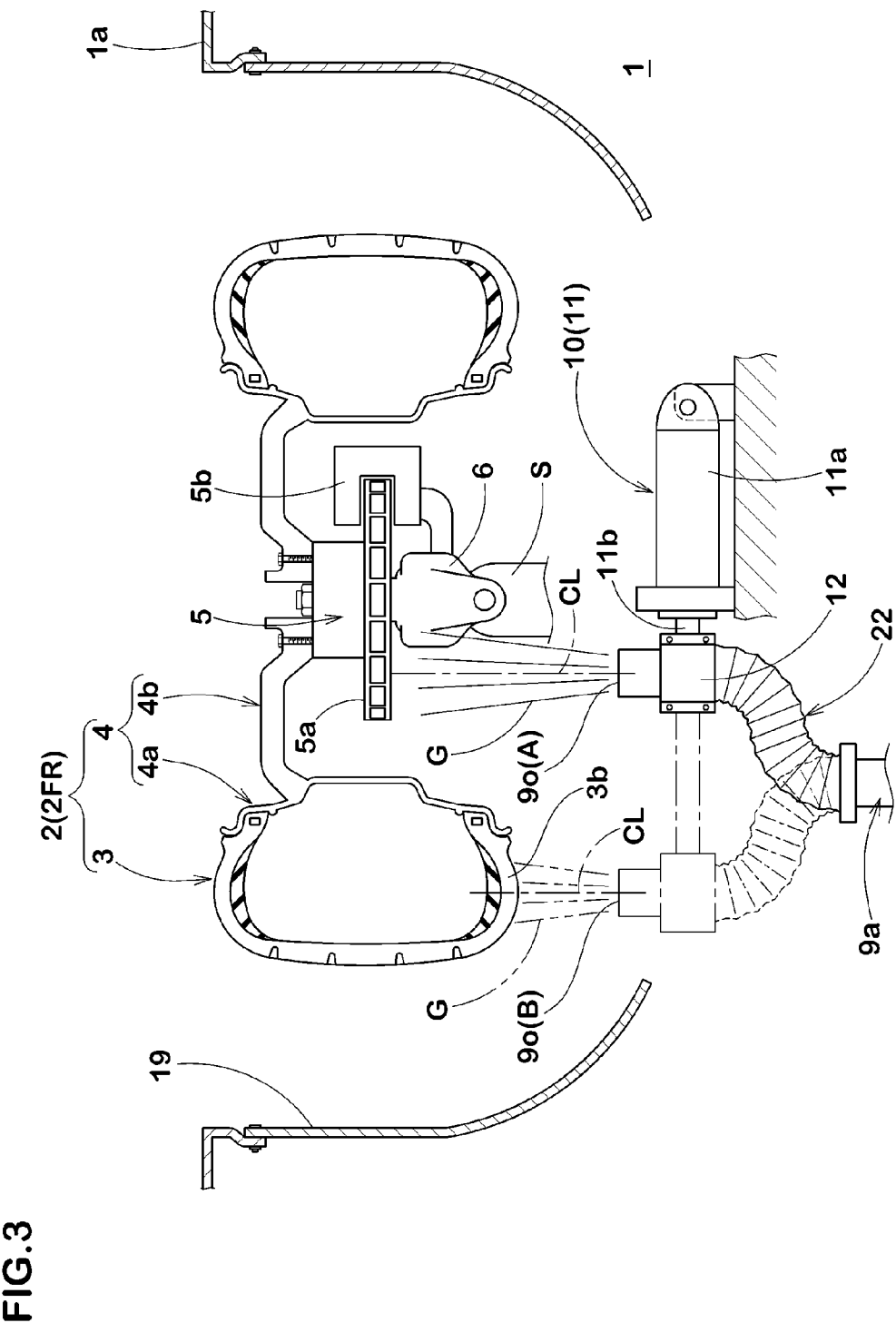
FIG. 3 A cross-sectional view taken along line A-A in FIG. 2.

FIG. 1 is a planar pattern diagram of a vehicle 1 according to the present embodiment. The vehicle 1 is a four-wheeled automobile (a passenger car), for example. A carbody 1a comprises four wheels: a front-right wheel 2FR, a front-left wheel 2FL, a rear-right wheel 2RR, and a rear-left wheel 2RL. FIG. 2 is a side view of the front-right wheel 2FR; and FIG. 3 is the top view thereof on behalf of all of them. Each of the wheels 2 includes a pneumatic tire 3 and a wheel rim 4 on which the pneumatic tire 3 is mounted.

Figure 4:
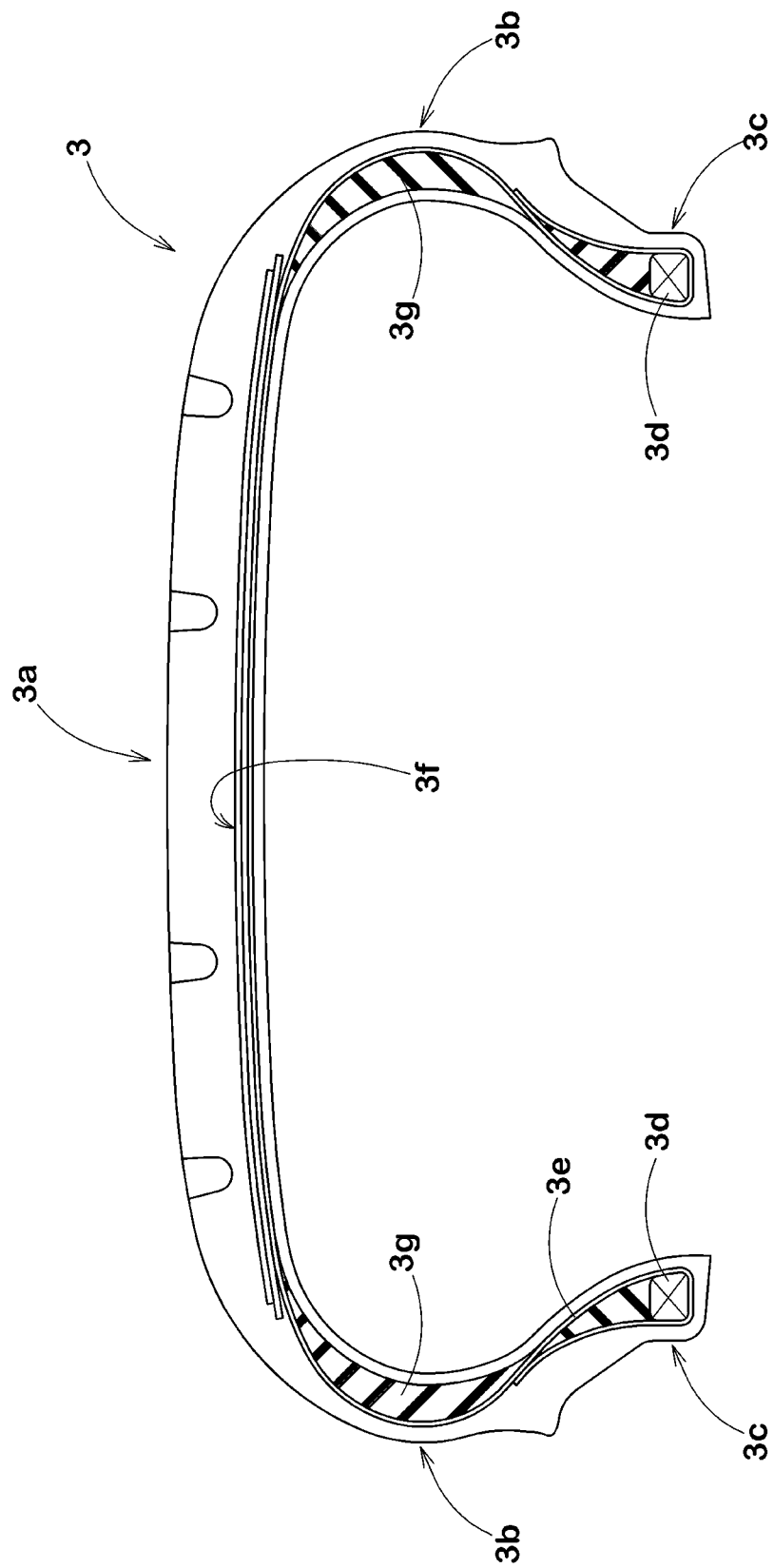
FIG. 4 A cross-sectional view of the pneumatic tire showing the present embodiment.

The above-mentioned pneumatic tire 3, as shown in an enlarged view of FIG. 4, comprises a tread portion 3a contacting the ground, a pair of sidewall portions 3b extending inwardly in the tire radial direction from both of the end portions thereof, a bead portion 3c connecting with each of the sidewall portions 3b and mounted on a wheel rim 4, a carcass 3e made of a carcass ply made of organic fiber cords of which both edges are fold up at each non-extensible bead core 3d buried in each of the bead portions 3c, and a belt layer 3f made of metal cords disposed outside the carcass 3e and inside the tread portion 3a.

The pneumatic tire 3 of the present embodiment is a run flat tire provided in the inside of the above-mentioned carcass 3e and in each sidewall portion 3b with a side reinforcing rubber layer 3g having a substantially crescent cross-sectional shape. In order to prevent significant deterioration of the ride comfort during normal running and to improve the bending rigidity of the sidewall portion 3b so as to reduce vertical deflection of the tire at the time of run-flat running, a comparatively hard rubber composition is preferably used for the above-mentioned side reinforcing rubber layer 3g, which has a JIS durometer A hardness of preferably not less than 60 degrees, more preferably not less than 65 degrees, and preferably not more than 95 degrees and more preferably 90 degrees.

Even when such a run flat tire is punctured, the tire does not promptly go out of running and can run, for example, at a speed of 80 km/h to reach a safe place including a nearest service station (for example, approximately 50 to 100 km). However, in the vehicle 1 according to the present invention, the run flat tire is not an indispensable feature.

The above-mentioned wheel rim 4 comprises a rim part 4a, which is substantially cylindrical, and on which the above-mentioned pneumatic tire is mounted and a disk part 4b attached or formed integrally on the rim part 4a. The disk part 4b is fixed to a hub (not shown) via a braking device 5 comprising a brake rotor 5a and a calliper 5b with a brake pad (also, as is shown in another embodiment in FIG. 9, the disk part 4b is fixed to the hub 13 with a hub bolt). The hub is attached to a knuckle 6 via a bearing. Moreover, the knuckle 6 is arranged in the carbody 1a operatively up-and-down and pivotably via a suspension system S.

As shown in FIG. 1, the vehicle 1 is provided with an air pressure monitoring device 7 to monitor each air pressure of the vehicle wheel 2. The air pressure monitoring device 7 is known for a direct or indirect method, for example.

In the air pressure monitoring device 7 in direct method, a pressure sensor is incorporated into each of the vehicle wheels 2 to detect an air pressure of the tire. The pressure sensor can be formed integrally with an air valve, for example. An electrical signal of responding the air pressure detected by the pressure sensor is sent to a carbody-side controlling device 14 (described below) with a signal line wirelessly or via a slip ring.

Additionally, the air pressure monitoring device 7 in the indirect method comprises a sensor to detect a rolling speed of each of the vehicle wheels 2. An output signal of the sensor is entered into a controlling device 14 such as a microcomputer. Thus, by conducting a predetermined calculation with using the signal, the vehicle wheel 2 with depressed air pressure is identified. That is to say, in the air pressure monitoring device 7 in indirect method, when the air pressure of the pneumatic tire 3 decreases, a dynamic rolling radius becomes reduced in size (in other words, the rolling speed increases compared to another vehicle wheel with the normal air pressure). With this, the vehicle wheel 2 with depressed air pressure is identified with the rolling speed ratio of the four vehicle wheels (see Japanese Patent No. 402884 and the like, for example).

The air pressure monitoring device in indirect method has a simple structure. On the negative side, there are an accuracy problem and a problem that the device cannot detect when the air pressures of all of four vehicle wheels are decreased and the like. In contrast, the air pressure monitoring device in direct method has no disadvantages as in indirect method. However, there is a possibility that an apparatus cost increases, so that it is desirable to separate them arbitrarily pursuant to a vehicle to use.

Moreover, the vehicle 1 is provided with a cooling unit 8 to expel a gas G to cool the pneumatic tire 3 from outside thereof when the air pressure of the pneumatic tire 3 decreases. Therefore, the vehicle 1 of the present embodiment can conduct heat away from the tire 3 running at depressed air pressure by expelling the gas G from outside thereof. Therefore, the heat generation of the pneumatic tire 3 running at low air pressure can be reduced without an excessive increase of a vertical spring constant of the tire 3 and the like (in other word, not causing an excessive deterioration of the ride comfort). Therefore, the durability of the pneumatic tire 3 during running at low air pressure improves. And, when the pneumatic tire 3 is a run flat tire as shown in the present embodiment, the running distance of runflat proceeding and/or the speed of run-flat running can increase remarkably.

More specifically, the cooling unit 8 according to the present embodiment, as shown in FIG. 1, comprises a duct 9 provided at one end thereof with an air intake port 9i for taking the air, and provided at another end thereof with a nozzle 9o for expelling the air;

a changeover device 10 for expelling at least a part of the air flowing through the duct 9 toward the pneumatic tire 3 when the air pressure of the pneumatic tire 3 decreases; and a controlling device 14 for controlling the changeover device 10 and the like.

As shown in FIG. 1, the air intake port 9i of the duct 9 is arranged in a front grille portion and in a hood bulge (not shown, respectively) and the like of the vehicle 1, for example, so as to open interiorly. Therefore, without driving a fan and the like, owing to the vehicle running, the intake port 9*i* can take in the air by itself. However, to add the fan and the like is acceptable. And, to prevent an entry of a foreign substance into the duct 9, it is desirable to mount an air filter (f) and the like on the air intake port 9*i*.

The duct 9 of the present embodiment diverges into four on a downstream side of the air intake port 9*i*, for example. Respective branched pipes 9*a* to 9*d* extend near the respective four vehicle wheels 2. On the down-most stream side of each of the branched pipes 9*a* to 9*d*, there is a nozzle 9*o* to expel the air led with the duct 9. In the present embodiment, as shown in FIG. 3, the nearby portion of each nozzle of the branched pipes 9*a* to 9*d* is formed as a flexible portion 22 in curving deformation.

The changeover device 10 of the present embodiment comprises, as shown in FIGS. 2 and 3, an actuator 11 having a rectilinear travel type. Various types of the actuator 11 can be adopted such as a system of utilizing a fluid pressure, a system of translating a rotational motion of an electric motor drive into a straight line motion or the like.

To prevent from interfering with a wheel house cover 19 and a suspension system 5, the actuator 11 comprises a cylindrical body 11*a* attached to a chassis of the above-mentioned carbody 1*a* and the like and a rod portion 11*b* capable of moving in and out from the main portion 11*a*, for example. In the present embodiment, the rod portion 11*b* of the actuator 11 is attached so as to be movable in the longitudinal direction of the carbody 1*a*. Incidentally, it will be obvious that a concrete attaching aspect is variously changeable. And, the tip of the rod portion 11*b* is fixed near the nozzle 9*o* of the duct 9 via a connecting tool 12.

The actuator 11 in an initial status is disposed on a position where the rod part portion 11*b* is shrunk. At this time, the nozzle 9*o* of the duct 9 is positioned in a point A facing to the braking device. More particularly, a central axis line CL of the nozzle 9*o* is arranged so as to intersect with a rotor surface of the disc rotor 5*a* of the braking device 5 (in the present embodiment, substantially orthogonally-crossed).

In contrast, as indicated by virtual lines in FIG. 3, the actuator 11 can be positioned in a point B facing to the pneumatic tire 3 by extending a rod portion 11*b* so as to move the nozzle 9*o* of the duct 9. More particularly, the central axis line CL of the nozzle 9*o* is arranged so as to intersect with the sidewall portion 3*b* inside the pneumatic tire 3.

During running with low air pressure or during run-flat running, the heat generated is notably higher in the vehicle inside portion than the tire equator c of the tire 3. Therefore, the nozzle 9*o* is, as disclosed in the present embodiment, preferably arranged so as to expel the air to the more inside portion of the vehicle than the tire equator c of the pneumatic tire 3.

Incidentally, the nozzle 9*o* can be arranged in an upper part of the pneumatic tire 3 so as to expel the air to the tread portion 3*a*. Moreover, each of the pneumatic tires 3 can be provided with plural nozzles 90 for expelling the air to both of the tread portion 3*a* and the sidewall portion 3*b* at the same moment, for example, so as to cool the pneumatic tire 3 more efficiency.

As shown in FIG. 1, a sensing signal sensed by an air pressure monitoring device 7 arranged in each vehicle wheel 2 is entered into the above-mentioned controlling device 14. And, the controlling device 14 can determine and identify the pneumatic tire 3 with fallen air pressure below a predetermined value as a tire with low air pressure or as a punctured tire on the basis of the entered sensing signal. And, the controlling device 14 can control the above-mentioned changeover device 10 so as to make at least a part of the air in the duct 9 expel toward the pneumatic tire 3.

The following is a working of the cooling unit 8 according to the present embodiment made up as described above.

First, when each of the vehicle wheels 2 of the vehicle 1 ordinarily runs at a moderate air pressure P2, it is believed that the heat generates from the tire 3 without influencing the durability. Under these circumstances, the controlling device 14 does not particularly change the changeover device 10. Therefore, the air trapped from the air intake port 9*i* of the duct 9 is expelled toward the braking device 5 of each of the vehicle wheels 2 via each of the branched pipes 9*a* to 9*d*. This cools the braking device 5 and can improve the braking efficacy thereof.

secondly, when the vehicle runs a nail into the tire so that the air pressure of the pneumatic tire 3 mounted on the front-right vehicle wheel 2FR falls to an air pressure P1, for example, the controlling device 14 determines that the air pressure of the pneumatic tire 3 mounted on the front-right vehicle wheel 2FR falls below the predetermined pressure on the basis of the sensing signal from the air pressure monitoring device 7. And the controlling device 14 outputs a drive signal to the changeover device 10 so as to stretch the rod portion 11*b* thereof. Thus, as indicated by virtual lines in FIG. 3, a position of the nozzle 9*o* of the branched pipe 9*a* is changed to the point B faced to the sidewall portion 3*b* of the pneumatic tire 3. Therefore, during the vehicle 1 running, all of the air flowing in the branched pipe 9*a* can be expelled toward the sidewall portion 3*b* of the pneumatic tire 3 with low air pressure and can cool the tire.

Therefore, during the normal running of the vehicle with the pneumatic tires 3 without depressed air pressure, the cooling unit 8 according to the present embodiment expels the air flowing in the duct 9 toward each of the braking devices 5 mounted on each of the vehicle wheels 2 so as to improve the braking efficacy. Meanwhile, when the air pressure of the pneumatic tire 3 decreases, the air flowing in the duct 9 is expelled toward the pneumatic tire 3, cools the pneumatic tire, and can slow down the increase in temperature thereof. Also, regarding a vehicle wheel mounting the pneumatic tire 3 with the normal air pressure, the air is expelled to the braking device 5 as heretofore. Therefore, the braking device 5 can be ongoingly prevented in overheating.

When the tire is a run flat tire, the above-mentioned air pressure P1 to activate the cooling unit 8 is desirably set to a punctured state where the heat generation is the most serious. In contrast, when the tire is a non-run flat tire, the air pressure P1 can be set to a lower air pressure (about 50% of the standard inner pressure, for example) than the standard inner pressure determined ("Maximum air pressure" in JATMA, a maximum value described in a table "TIRE LOAD LIMITS AT VARIOUS COLD INFLATION PRESSURES" in the case of TRA, and "INFLATION PRESSURE" in the case of ETRTO and the like).

Although the above-mentioned gas G is the air in the present embodiment, various gases other than the air that enable to cool the pneumatic tire 3 can be adopted. For example, the vehicle 1 is equipped with a bomb containing a gas other than the air, and the gas G can be expelled toward the pneumatic tire 3 with low air pressure.

Moreover, in order to cool the running pneumatic tire 3, a temperature of the gas G is required to be lower than that of the tire, especially than that of the tread portion 3*a* and the sidewall portion 3*b*. In view of those facts, it is desirable that the gas G is expelled toward the pneumatic tire 3 at a temperature of preferably not more than 60 deg. C., more preferably not more than 50 deg. C., much more preferably not more than 40 deg. C. Also, as shown in FIG. 1, to cool down the air temperature, the duct 9 can comprise a heat-exchange equipment 20 and the like along the path.

Also, in the above-mentioned embodiment, when the air pressure of the pneumatic tire 3 falls below the pressure P1, the changeover device 10 is promptly changed so as to expel the air into the pneumatic tire 3, but not limited to this embodiment. For example, the changeover device 10 can output a drive signal after passing a predetermined time from falling of the air pressure of the pneumatic tire 3 below the pressure P1. In such an aspect, it is possible to change the device to expel the air toward the pneumatic tire 3 after fully generating in heat of the tire so as to cool down the braking device 5 to the utmost limit.

Figure 5:
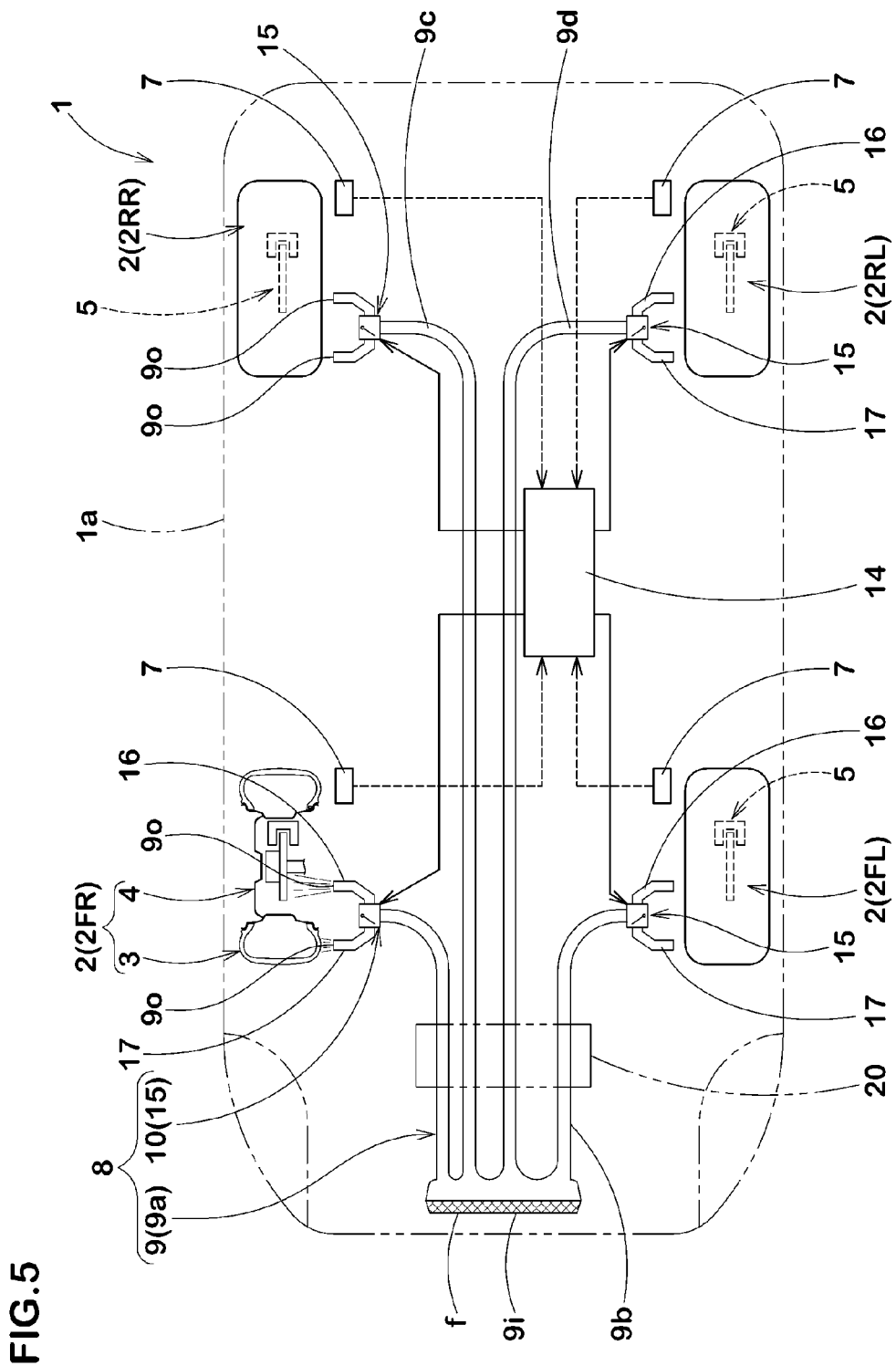
FIG. 5 A planar pattern diagram of the vehicle showing another embodiment of the present invention.
Figure 6:
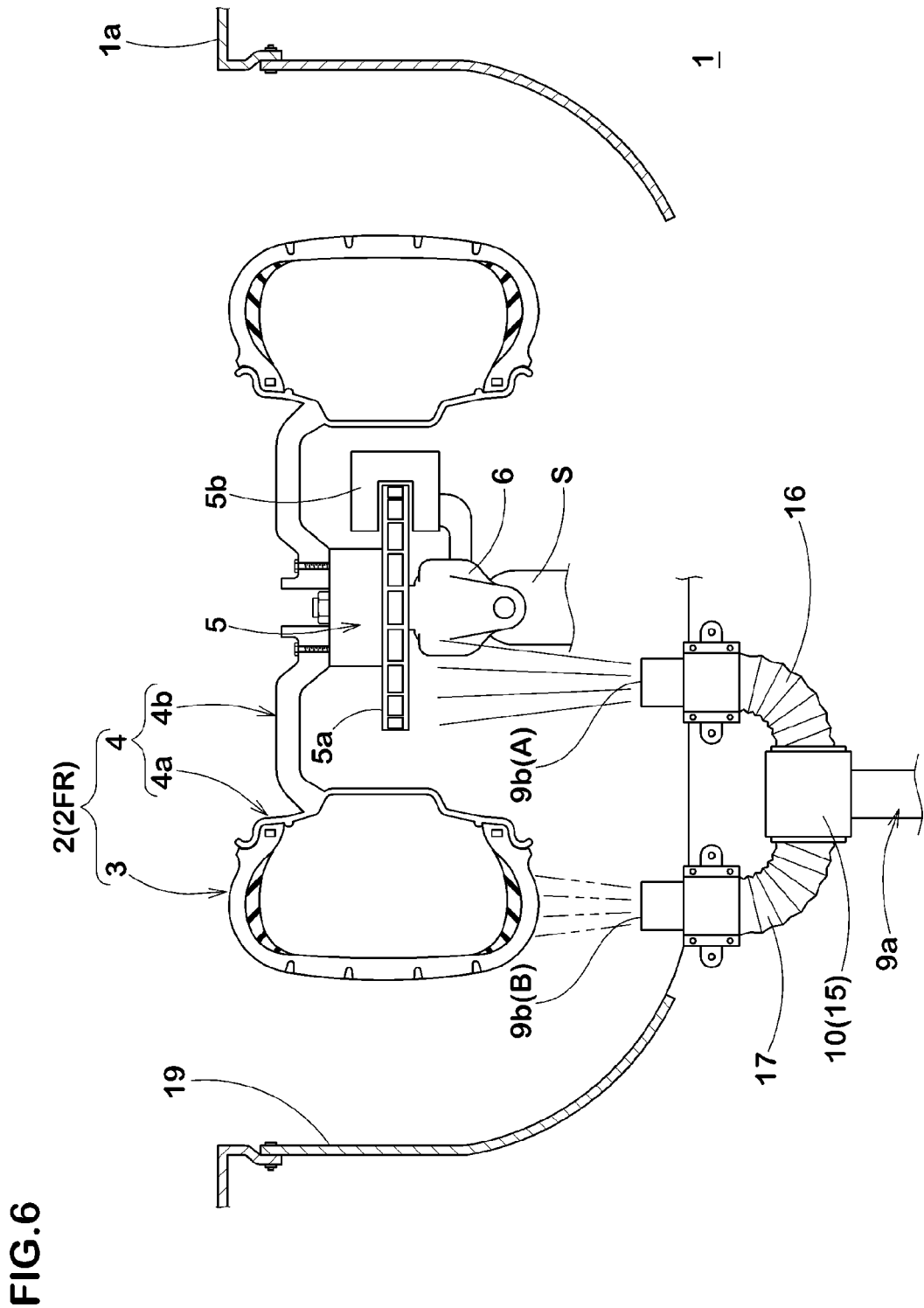
FIG. 6 An enlarged view of a substantial part near the front-right wheel thereof.

FIG. 5 and FIG. 6 show another embodiment of the present invention.

In this embodiment, on a lower side of each of the branched pipes 9a to 9d of the duct 9, the changeover valve 15 is connected as the changeover device 10. And, the changeover valve 15 is connected to a first branched pipe 16 disposed on the point A where the nozzle 9b is facing to the braking device, and to a second branched pipe 17 disposed on the point B where the nozzle 9b is facing to the sidewall portion 3b of the pneumatic tire 3. The changeover valve 15 is an electromagnetic valve, for example, and it enables to change over the direction of the air flowing in the duct 9 to the first branched pipe 16 or the second branched pipe 17 by the controlling device 14.

The cooling unit 8 according to this embodiment, during the normal running of the vehicle with the pneumatic tire 3 without depressed air pressure, the controlling device 14 changes the changeover valve 15 so as to flow the air in the duct 9 into the first branched pipe 16. This enables the air flowing in the duct 9 to expel toward the braking device mounted on each of the vehicle wheels 2, and therefore the braking efficacy can be improved.

Meanwhile, when the air pressure of one of the pneumatic tires 3 decreases, the controlling device 14 outputs a valve change-over signal to the changeover valve 15 of the vehicle wheel 2 with decreased air pressure and changes the direction of the air in the duct 9 to flow to the second branched pipe 17. Therefore, the air flowing in the duct 9 is expelled toward the pneumatic tire 3 and can eventually cool the pneumatic tire 3 during running with low air pressure.

Also, for the changeover valve 15, a valve capable of sending the air to both the first branched pipe 16 and the second branched pipe 17 and of changing the expelling ratios thereof can be adopted. In such an embodiment, during running with low air pressure, for example, the air in the duct 9 is expelled at a rate of 80% toward the pneumatic tire 3 and 20% to the braking device, for example. Depending on the situation, both of the heat generations from the pneumatic tire 3 and the braking device 5 can be prevented.

Moreover, also in an embodiment of using a gas for the fluid, yet another configuration can become operative. For example, in the present embodiment, at least the following aspects are concluded.

Transfiguration Example 1

The above-mentioned embodiment shows the cooling unit 8, which cools also the braking device. However, the cooling unit 8 can expel a part of the air as substitute for the braking device toward heat generation equipments mounted on the vehicle such as a turbine and a radiator of a super charger and the like.

Transfiguration Example 2

Although all of the vehicle wheels 2 are provided with the nozzles 9b expelling the gas G in the above-mentioned embodiment, a front-engine front-drive car for example can be provided with the cooling unit 8 in only the front wheels of propulsion wheels having a large axle load and being easy for pipework.

Transfiguration Example 3

The above-mentioned embodiment shows an aspect in which the controlling device 14 automatically controls expelling the air toward the pneumatic tire 3. However, it is possible to provide an operating switch for a cooling unit drive (not shown) in a driver's seat and to make input the signal into the controlling device 14. In this embodiment, it is possible to expel forcibly and manually the air to the tire with low air pressure by a remote-control operation from the driver's seat.

Transfiguration Example 4

The cooling unit 8 can expel the gas to cool the pneumatic tire 3 from the outside thereof even if before the air pressure of the pneumatic tire 3 decreases. Also in this instance, the heat generation of the tire is prevented so that an energy loss reduces and a running resistance decreases. Therefore, a fuel consumption of the vehicle 1 can be improved.

Embodiment

A Case that the Fluid to Cool the Tire is a Liquid

Next, another embodiment of the present invention on a case that a fluid to cool the tire is a liquid will be described with reference to the figures from FIG. 7.

Figure 7:
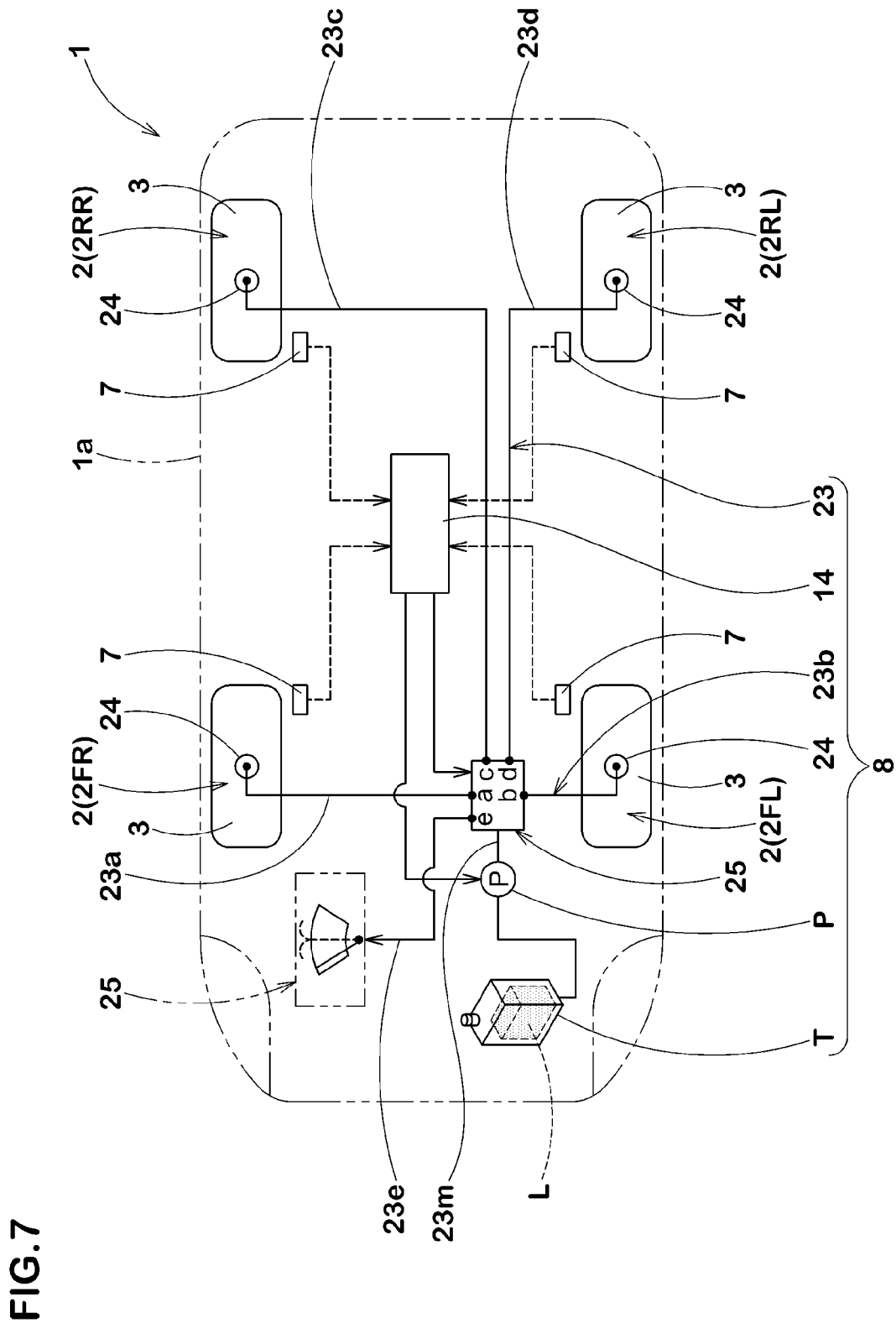
FIG. 7 A planar pattern diagram of the vehicle showing yet another embodiment of the present invention.
Figure 8:
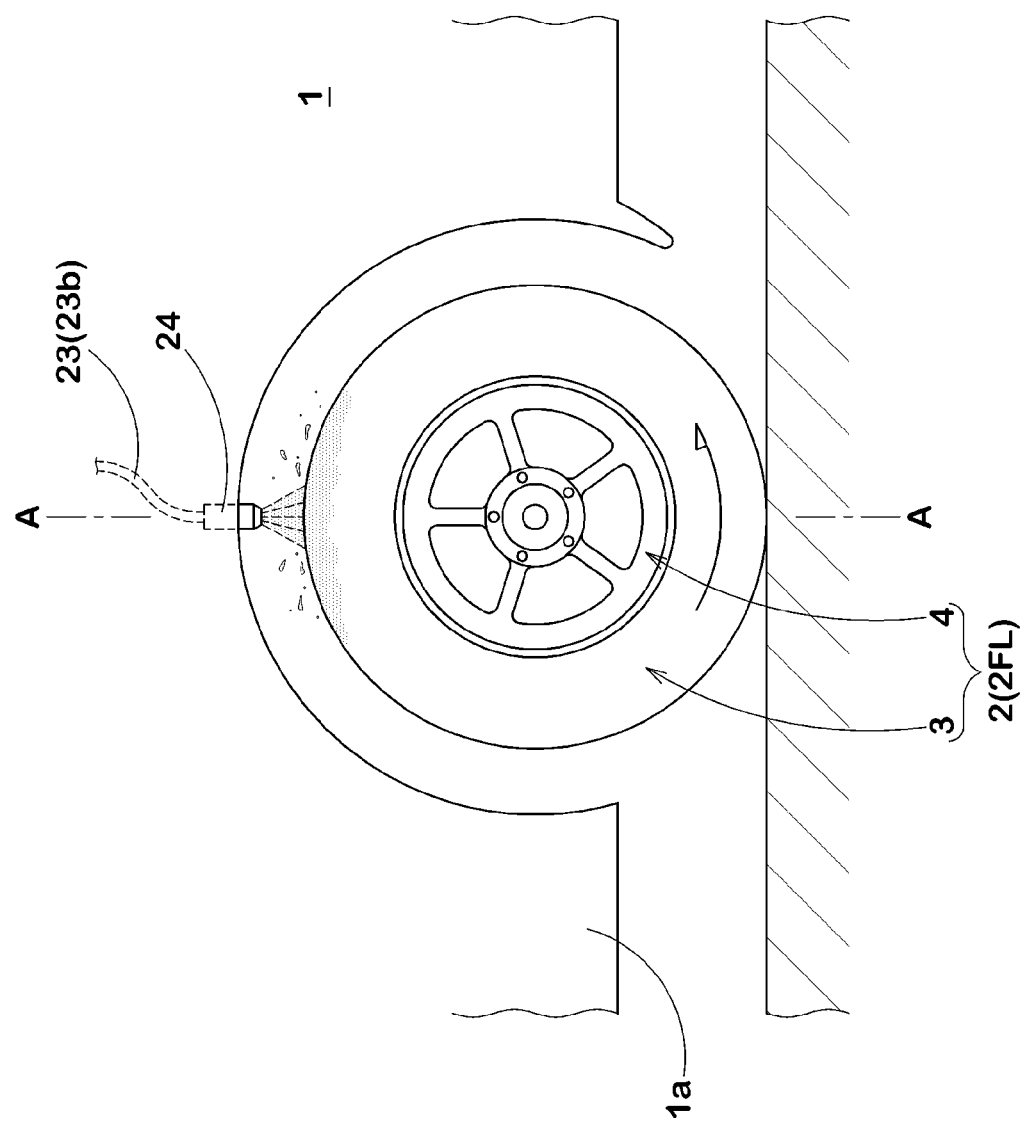
FIG. 8 A partial side view of a left-front wheel thereof.
Figure 9:
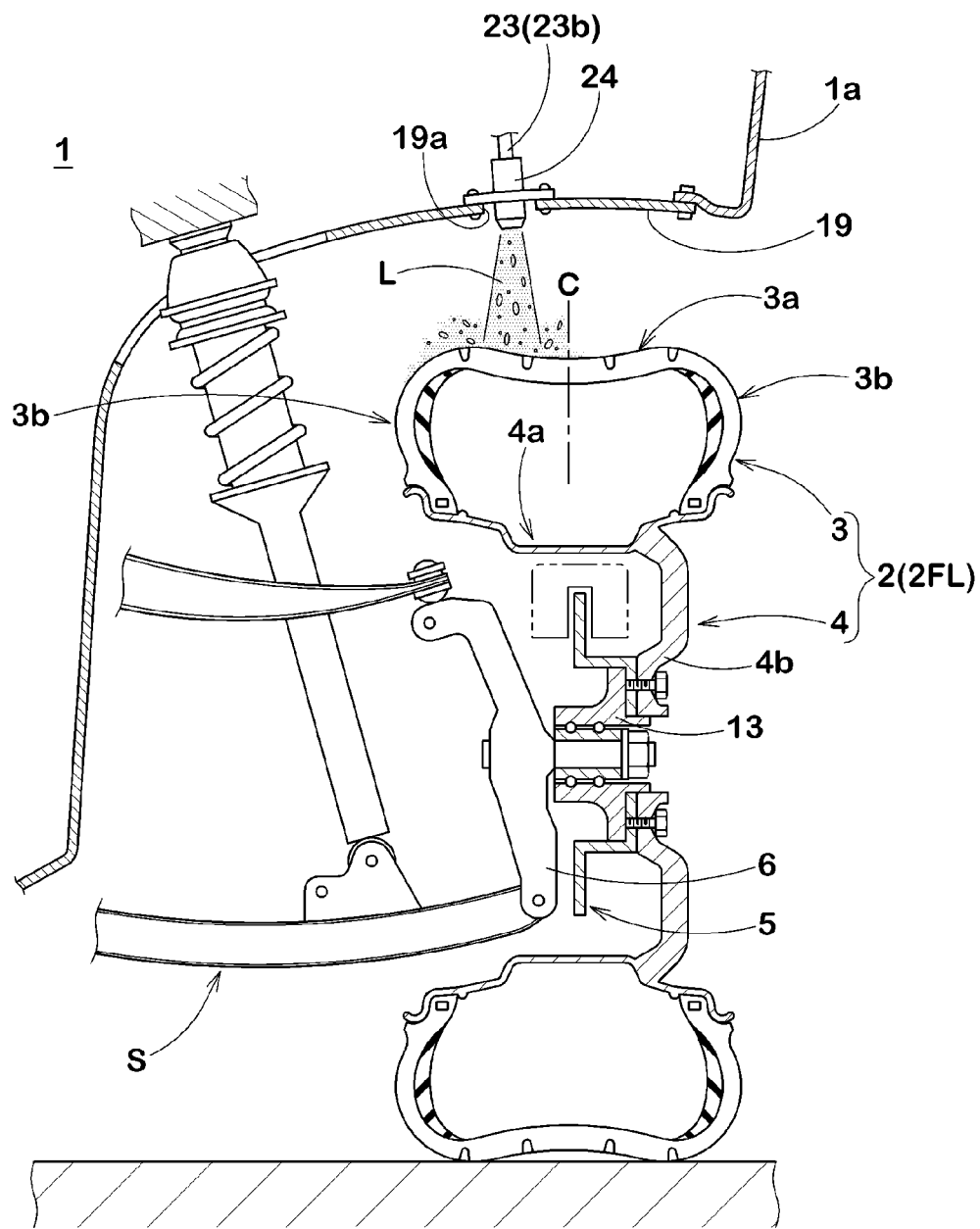
FIG. 9 A cross-sectional view taken along line A-A in FIG. 8.

FIG. 7 shows a planar pattern diagram of the vehicle 1 concerning the present embedment. FIG. 8 shows a side view of a front-left wheel 2FL, and FIG. 9 shows a cross-sectional view taken along line A-A thereof, respectively. In the present embodiment, the vehicle 1 is provided with a cooling unit 8 which expels the liquid L to cool the pneumatic tire 3 from the outside thereof when the air pressure of the pneumatic tire 3 decreases. Also, excepting the cooling unit 8 and the controlling device 14, the same parts as the above-mentioned embodiment are assigned the same symbolic names without going into details.

The cooling unit 8 can expel the liquid L to the tire 3 running at low air pressure from the outside thereof so as to remove the heat thereof. Therefore, also in the vehicle 1 according to the present embodiment, the heat generation of the pneumatic tire 3 running at low air pressure can be prevented without excessively raising of the vertical spring constant of the tire 3 and the like (in other word, without causing a significant deterioration of the ride comfort). Therefore, the durability of the pneumatic tire 3 running at low inner pressure is improved. Moreover, when the pneumatic tire 3 is a run flat tire, the running distance of run flat proceeding thereof and/or the speed of run-flat running are improved and the like so that the same efficacy as the above can be expected.

The cooling unit 8 according to the present embodiment comprises
a tank T to store the liquid L,
a pump P to send the liquid from the tank T,
a flow channel 23 connected the one end thereof with the pump P and communicated the other end thereof with the nozzle 24 facing toward the above-mentioned pneumatic tire 3, and a controlling device 14 to drive-control the above-mentioned pump P and the like.

For the above-mentioned liquid L, any various liquids that adhere to the pneumatic tire 3 and take heat from it can be adopted. In the present embodiment, water having a large latent heat of vaporization is used in the present embodiment. Subsequently, various materials can be added to the water. When the liquid L is expelled, it is needed to keep the temperature thereof lower than that of the tire, especially the tread portion 3a and the sidewall portion 3b, in order to cool the running pneumatic tire 3. In view of those facts, the liquid L is expelled to the pneumatic tire 3 at a temperature of preferably not more than 60 deg. C., more preferably not more than 50 deg. C.

The above-mentioned tank T and pump P is placed in a space in the hood of the carbody 1a, for example. Therefore, to open the hood (not shown) of the vehicle 1 makes operation of refilling of the liquid L into the tank T and maintenance and the like easy.

In this embodiment, the nozzle 24 expelling the liquid L is fixed up in each of the vehicle wheels 2 as shown in FIG. 1. Moreover, the each nozzle 24 is arranged, as shown in FIG. 2 and FIG. 3, in a downward direction from an opening 19a provided in the wheel house cover 19 of the vehicle 1. This makes the cooling unit 8 possible to expel the liquid L from an upper part of the pneumatic tire 3 toward the lowly-placed tread portion 3a. The nozzle 24 can be a normal opening and can be a nozzle orifice capable of turning the liquid into a spray. However, when taking account of adherability and the like of the liquid L to the tire 3, the liquid L is preferably jetted under high pressure (to fall at a larger acceleration than a free fall) toward the tire without being sprayed but with keeping in the form of a liquid.

Moreover, during running at lower inner pressure and during run-flat running, it tends that the heat generation on an inner side of the width direction of the tire 3 (an inner side of the vehicle than the tire equator c) has a tendency to become large, as previously mentioned. Therefore, the nozzle 24 is preferably disposed so as to expel the liquid L to the inner side portion of the vehicle than the tire equator c of the pneumatic tire 3. From the viewpoint of this, the nozzle 24 can be also arranged so as to expel the liquid L toward the sidewall portion 3b of the pneumatic tire 3 facing to the inner side of the vehicle.

Moreover, the each pneumatic tire 3 is provided with a plural of nozzles 24, and, for example, the liquid is expelled toward the tread portion 3a and the sidewall portion 3b respectively so as to cool the pneumatic tire 3 more efficiently.

The above-mentioned flow channel 23 comprises, for example, a changeover valve 25 in a solenoid operation type;

a single main flow channel 23m connecting the changeover valve 25 with the pump P; and plural branch flow channels 23a, 23b, 23c, and 23d providing in respective one ends connected to the output ports (a), (b), (c), and (d) of the above-mentioned changeover valve 25, and in respective other ends connected to the nozzles 24 facing toward the pneumatic tires 3 mounted on the respective vehicle wheels 2FR, 2FL, 2RR, and 2RL.

Furthermore, the flow channel 23 according to the present embodiment comprises an auxiliary branched pipe 23e of which one end is connected with the output port (e) of the changeover valve 25 and of which the other end is connected with a wash fluid nozzle (not shown) of a window washer apparatus 25. Therefore, in the controlling device 14, based on requirements of an operation command of the window washer apparatus 23 operated from the driver's seat, the port for output of the changeover valve 25 is changed into "e" and the pump P is driven so as to jet the liquid L of the above-mentioned tank T from the wash fluid nozzle toward a window glass (not shown) of the vehicle. In this way, the cooling unit 8 according to the present embodiment can share the tank T and the pump P with the window washer apparatus 25 mounted normally on the passenger vehicle. Therefore, the vehicle 1 according to the present embodiment is desirable in terms of realizing the cooling unit 8 with a few additional parts and at low cost.

Into the above-mentioned controlling device 14, the sensing signal of the air pressure monitoring device 7 provided in each vehicle wheel 2 is entered. And, the controlling device 14 can determine and identify the pneumatic tire 3 with fallen air pressure below the predetermined value as a tire with low air pressure or as a punctured tire on the basis of the entered sensing. And, the controlling device 14 can control the above-mentioned pump P and the changeover valve 25 so as to cool the pneumatic tire 3 by expelling the liquid L.

Figure 10:
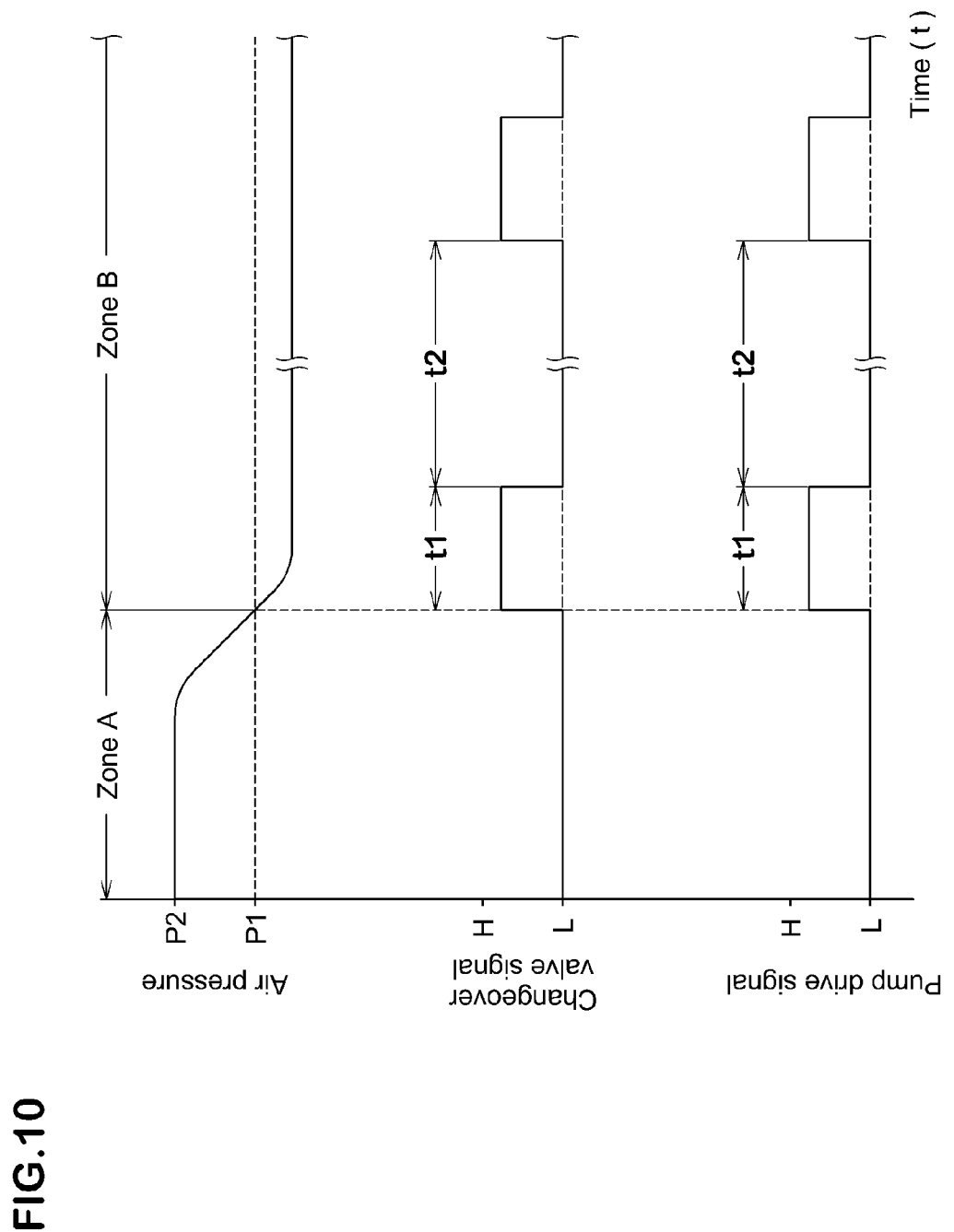
FIG. 10 Time charts of an air pressure, a pump drive signal, and a manipulated signal of a changeover valve for explaining an operation of a controlling device.

FIG. 10 shows time charts showing an example of operating procedures of such a controlling device 14. In FIG. 10, the upper chart shows a time variation of an air pressure of a pneumatic tire having a low air pressure (in the present example, the pneumatic tire 3 mounted on the front-left vehicle wheel 2FL). The middle chart shows a time variation of a voltage level of a manipulated signal to change the output port of the changeover valve 25 into "b" in order to send the liquid L to the pneumatic tire 3 mounted on the front-left vehicle wheel 2FL. And, the lowermost chart shows a time variation of a voltage level of the drive signal for driving the pump P. Their temporal axes are got lined up.

First, when each of the vehicle wheels 2 of the vehicle 1 ordinarily runs under a moderate air pressure P2, it is considered that a heat generates from the tire 3 without influencing the durability. Under these circumstances, the controlling device 14 does not particularly change the changeover valve 25 and does not drive the pump P (a zone A). Therefore, the liquid L is not expelled toward the pneumatic tire 3.

secondly, for example, when the vehicle runs a nail into the tire and the air pressure of the pneumatic tire 3 mounted on the front-left vehicle wheel 2FL falls to an air pressure P1, the controlling device 14 determines, on the basis of the sensing signal from the air pressure monitoring device 7, that the air pressure of the pneumatic tire 3 of the front-left vehicle wheel 2FL falls below the predetermined pressure P1. And the controlling device 14 outputs a high-leveled manipulated signal to the changeover valve 25, changes the output port into "b", and outputs a high-leveled drive signal to the into pump P. Thus, the liquid L is expelled in a high pressure to the tread portion 3a of the pneumatic tire 3, as shown in FIG. 8 and FIG. 9, through the tank T, the pump P, the main flow channel 23m, the output port (b) of changeover valve 25, and the branch flow channel 23a and the nozzle 24.

The liquid L attached to the pneumatic tire 3 spreads broadly by the gravitational force or a centrifugal force during running and can absorb heat from a broad area of the tire outer surface. In particular, the liquid L expelled to the tread portion 3a can draw heat from both of the tread portion 3a and the sidewall portion 3b by flowing also into the sidewall portion 3b. Therefore, the cooling unit 8 of the present embodiment can cool the pneumatic tire 3 running at low inner pressure and can slow an increase in temperature thereof. Also, such an operation can be performed regardless of the vehicle 1 running or standing.

when the tire is a run flat tire, the above-mentioned air pressure P1 to operate the cooling unit 8 is desirably set to a puncture state where the heat generation is most serious. In contrast, when the tire is a non-run flat tire, the air pressure P1 can be set to a lower air pressure than a standard inner pressure (about 50% of the standard inner pressure, for example) determined by standards ("Maximum air pressure" in JATMA, a maximum value described in a table "TIRE LOAD LIMITS AT VARIOUS COLD INFLATION PRESSURES" in the case of TRA, and "INFLATION PRESSURE" in the case of ETRTO and the like).

The above-mentioned liquid L is expelled by the controlling device 14 at a time t1 that signals of the change-over valve 25 and the pump drive are being outputted and expelled only to the pneumatic tire 3 having a depressed air pressure. This can cool the pneumatic tire 3 by using a limited quantity of the liquid L efficiently.

Moreover, the cooling unit 8 according to the present embodiment can discharge the liquid L intermittently. In this embodiment, the manipulated signal of the changeover valve 25 and the pump drive signal are outputted in a regular time interval t2 after the air pressure falls below the pressure P1. This can cool the tire 3 by a limited quantity of liquid continually and efficiently. Such a cooling method can improve efficaciously a run-flat running distance and/or a speed of run-flat running.

The above-mentioned time t1 per expelling of the liquid is not particularly limited. The time t1 is desirably determined as an enough time to expel a necessary quantity of the liquid for cooling the pneumatic tire 3.

Moreover, the necessary liquid quantity per expelling for cooling the tire is determined pursuant to the tire size and the like, and preferably not less than 30 $cm^3$, more preferably not less than 50 $cm^3$, furthermore preferably not less than 100 $cm^3$. In contrast, since a quantity of liquid stored in the tank T has a limit, the number of expelling decreases possibly when the liquid quantity per expelling becomes much. From the viewpoint of this, the liquid quantity per expelling is preferably not more than 300 $cm^3$, more preferably not more than 250 $cm^3$, much more preferably not more than 200 $cm^3$.

Moreover, as shown in FIG. 10, the time interval t2 to discharge intermittently the liquid L is necessary to be determined considering air temperature, weather, road surface temperature, running speed, movable load and/or the like; therefore, it is not especially limited. However, when the time interval t2 is too short, the liquid in the tank T is instantly consumed, and it tends to be difficult to keep the cooling effect effectively. However, when the time interval t2 becomes long, the heat generation from the tire during high speed running cannot be sufficiently suppressed. Assuming a run-flat running on an expressway (at the running speed of about 80 km/h), the time interval t2 is preferably set in a range of about from 5 to 15 minutes.

And, in the above-mentioned embodiment, when the air pressure of the pneumatic tire 3 falls to the pressure P1, the liquid L is instantly expelled into the pneumatic tire 3, but not limited to such an embodiment. For example, it is possible to output the manipulated signal of the changeover valve 15 and the pump drive signal after passing a predetermined time from the air pressure of the pneumatic tire 3 falling to the pressure P1. In such an aspect, the liquid L can be expelled to the pneumatic tire 3 after plenty of heat generating of the tire and can cool the tire; therefor, the increase in temperature of the tire can be suppressed efficiency.

Moreover, the above-mentioned embodiment shows an aspect that the liquid L is expelled at the predetermined regular time interval t2. However, the cooling unit 8 can also be formed so as to expel the liquid L at a predetermined running distance interval. For example, when the air pressure decreases, as a first cooling step, the liquid L is expelled to the pneumatic tire 3 with depressed air pressure. Next, the controlling device 14 reads running distance data from the running distance meter and the like and can expel intermittently the liquid L per predetermined running distance from the first cooling step.

According to various experiments, assuming the average running speed during the run-flat running of from 70 to 90 km/h, positive outcomes can be produced by expelling the liquid L of from 100 to 300 $cm^3$ toward the pneumatic tire 3 every running distance of 10 to 20 km.

Also in this embodiment, changing of shape into yet another aspect can be operated. As transfiguration Examples, at least following embodiments are included.

Transfiguration Example 1

In the above-mentioned embodiment, although the tank T of the cooling unit 8 doubles as the window washer apparatus 17, as substitute for the window washer apparatus 25 or additionally, the tank T can also double as a reserve tank for storing coolant of a radiator (not shown). In the case of that, for example, it is desirable to supply water from the reserve tank when the tank T gets empty only.

Transfiguration Example 2

In the above-mentioned embodiment, although each of the vehicle wheels 2 is provided with nozzle 24 which can expel the liquid L, a front-engine front-drive car, for example, can be provided with the nozzle 24 in only the front wheels of propulsion wheels having a large axle load and being easy for pipework.

Transfiguration Example 3

The above-mentioned embodiment shows an aspect in which the controlling device 14 automatically controls expelling the liquid L. However, it is possible to be provided with an operating switch for the cooling unit drive in a driver's seat and to make enter the signal into the controlling device 14. In this embodiment, it is possible to expel forcibly and manually the liquid toward the tire with depressed air pressure by a remote-control operation from the driver's seat.

Transfiguration Example 4

The vehicle 1 can be provided with a temperature sensor (not shown) to detect the temperature of the pneumatic tire 3. This temperature sensor is preferably integrated into the air pressure monitoring device 7, for example. Thus, when the air pressure decreases, as the first cooling step, the controlling device 14 expels the liquid L toward the pneumatic tire 3 with depressed air pressure. And after that, the controlling device also can expel the liquid L when the sensing signal of the temperature sensor is heated above a predetermined temperature, for example.

Hereinbefore, especially preferred embodiments of the present invention were described, but without limitation to the above embodiments, it will be obvious that various changes may be made without departing from the scope of the present invention.

EXAMPLES

Example 1

Example of that a Fluid is Gas

In order to confirm an effect of the present invention, using the following vehicle, run-flat running tests were conducted. The specifications of the vehicle were as follows:

Displacement volume: 4300 cc, a rear-wheel drive vehicle manufactured in Japan

Tire (each wheel): a run-flat-type pneumatic tire having a size of 245/40R18

Front wheel load: 5.29 kN

Rear wheel load: 5.39 kN

Front wheel camber angle: 1 deg. (negative)

cooling unit equipped.

Moreover, in a run-flat running test, the front-right wheel got into a punctured state with air pressure of zero (the other three tires had an air pressure of 230 kPa). The car continuously ran at an average running speed of 80 km/h on a test course of a drying asphalt road surface for high speed running (weather: sunny; Air temperature: 24 deg. C.). A run-flat running distance until destruction of the tire was studied.

In the vehicle according to Example 1, a cooling unit was always operated during the test running, and the air was expelled at a speed of about 50.4 km/toward a sidewall portion of the punctured tire on an inner side of the vehicle.

In contrast, in Conventional Example, no cooling unit was conducted during the test running.

Figure 11:
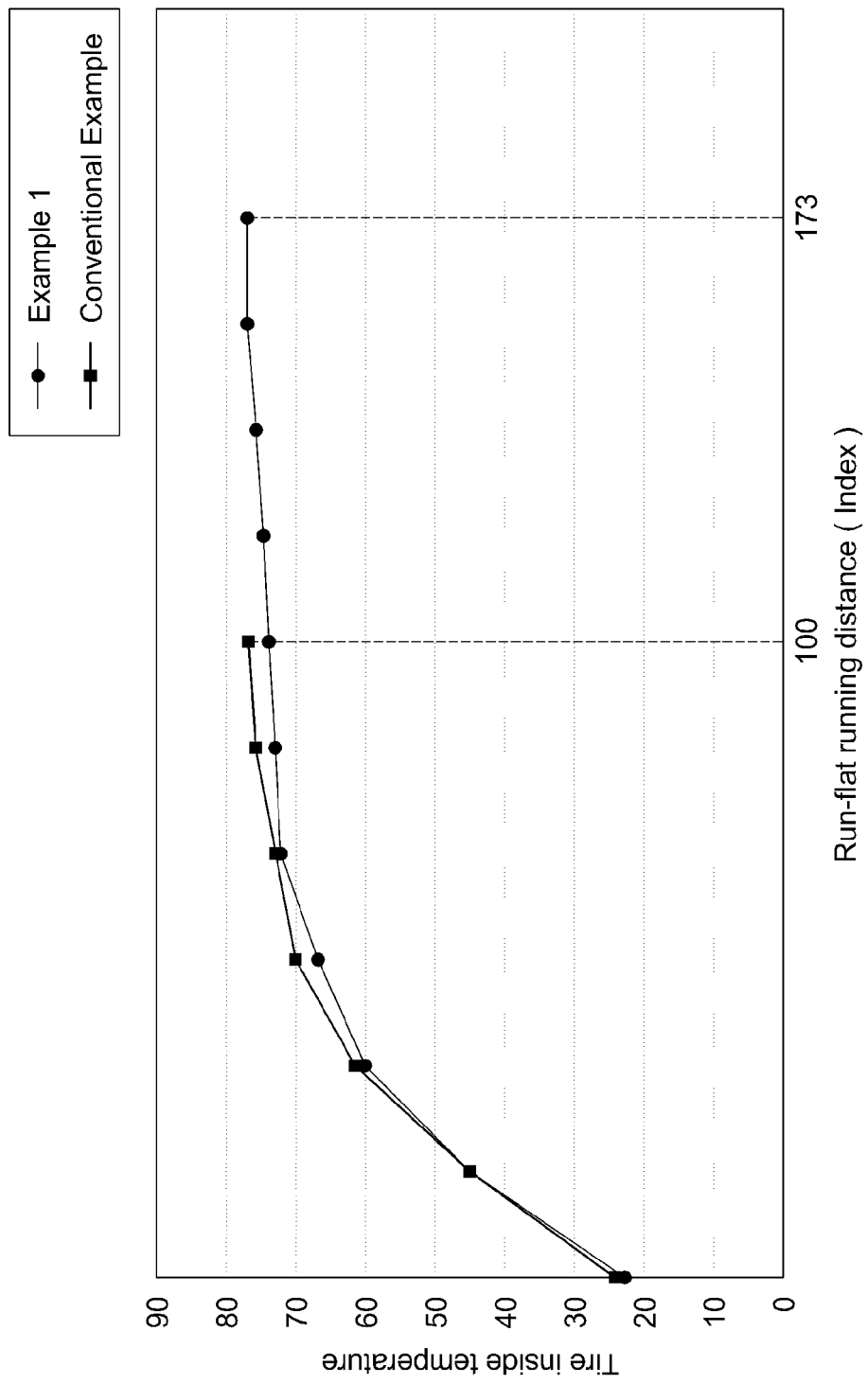
FIG. 11 A graph showing a relationship between a running distance index and a tire inside temperature according to Example 1.
Figure 12:
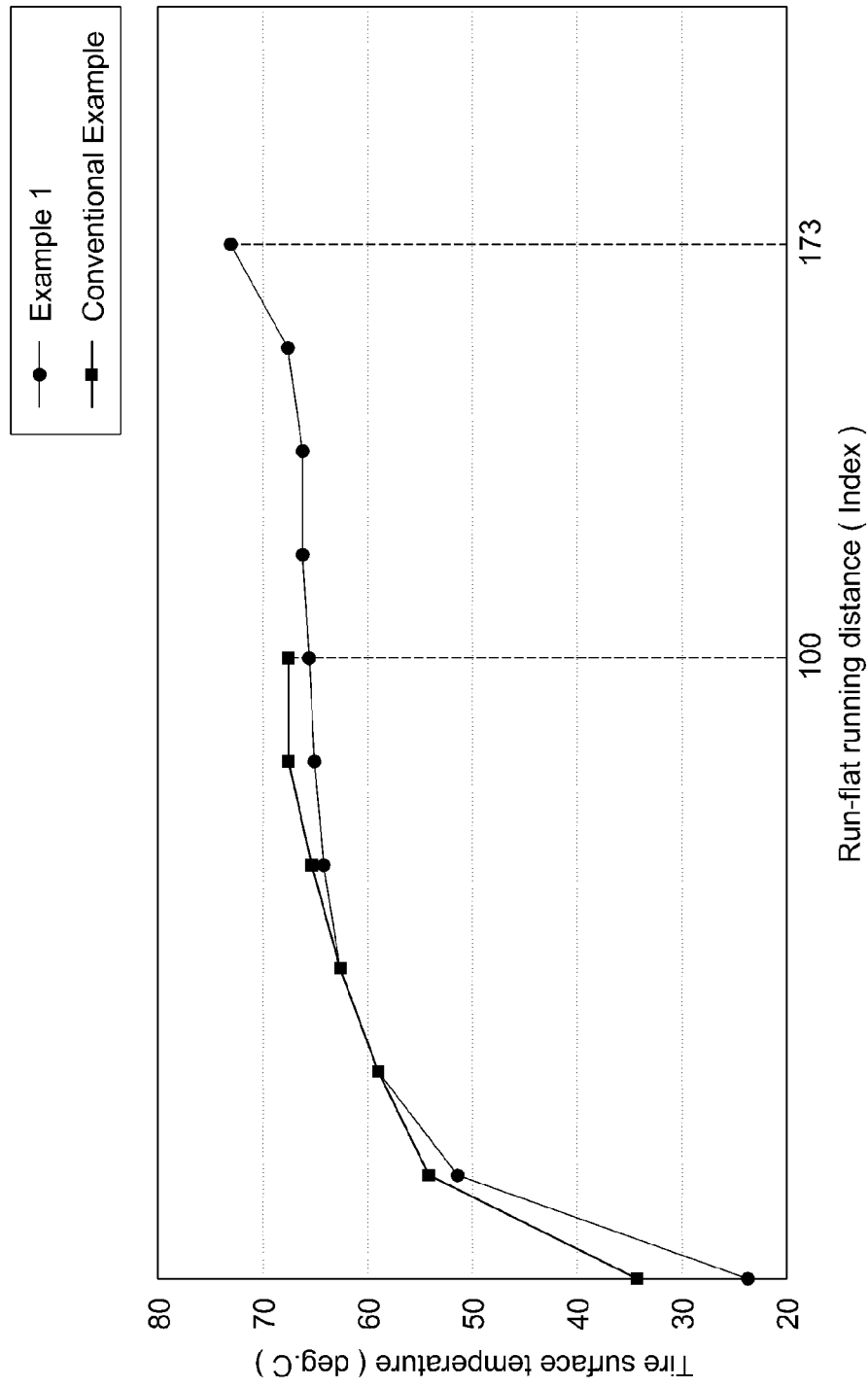
FIG. 12 A graph showing a relationship between a running distance index and a tire surface temperature according to Example 1.

The test results are shown in FIG. 11 and FIG. 12. FIG. 11 shows a relationship between an atmosphere temperature of the tire inside measured near an air valve by a temperature sensor and a run-flat running distance index which evaluation is displayed using indices with the conventional run-flat running distance being 100. And, FIG. 12 shows a relationship between a pneumatic tire surface (a surface temperature of the sidewall portion measured by a non-contact type infrared radiation sensor) and the run-flat running distance index.

As the result of the tests, it was expressly confirmed an increase in temperature during run-flat running in the vehicle according to Example 1. Moreover, it was confirmed that the vehicle according to Example 1 could run 1.73 times the run-flat running distance of Conventional Example and that the running distance was prominently increased.

Example 2

Example of that a Fluid is Liquid

As an embodiment shown in FIGS. 7 to 9, a run-flat running test was conducted with the following vehicle. The specification of the vehicle was the same as the above.

Moreover, in a run-flat running test as with the above, the front-right wheel got into the punctured state with inner pressure of zero (the other three tires had an air pressure of 230 kPa). The car continuously ran at an average running speed of 80 km/h on the test course of the drying asphalt road surface for high speed running (weather: sunny; Air temperature: 24 deg. C.). A run-flat running distance until destruction of the tire was studied.

In the vehicle according to Example 2, the cooling unit was put into operation during test running so as to expel water at a temperature of about 25 deg. C. at high pressure for about three minutes every 10 km (Quantity per expelling: 200 cm$^3$) toward the tread portion of the tire.

In contrast, in conventional Example, no cooling unit was conducted during the test running.

Figure 13:
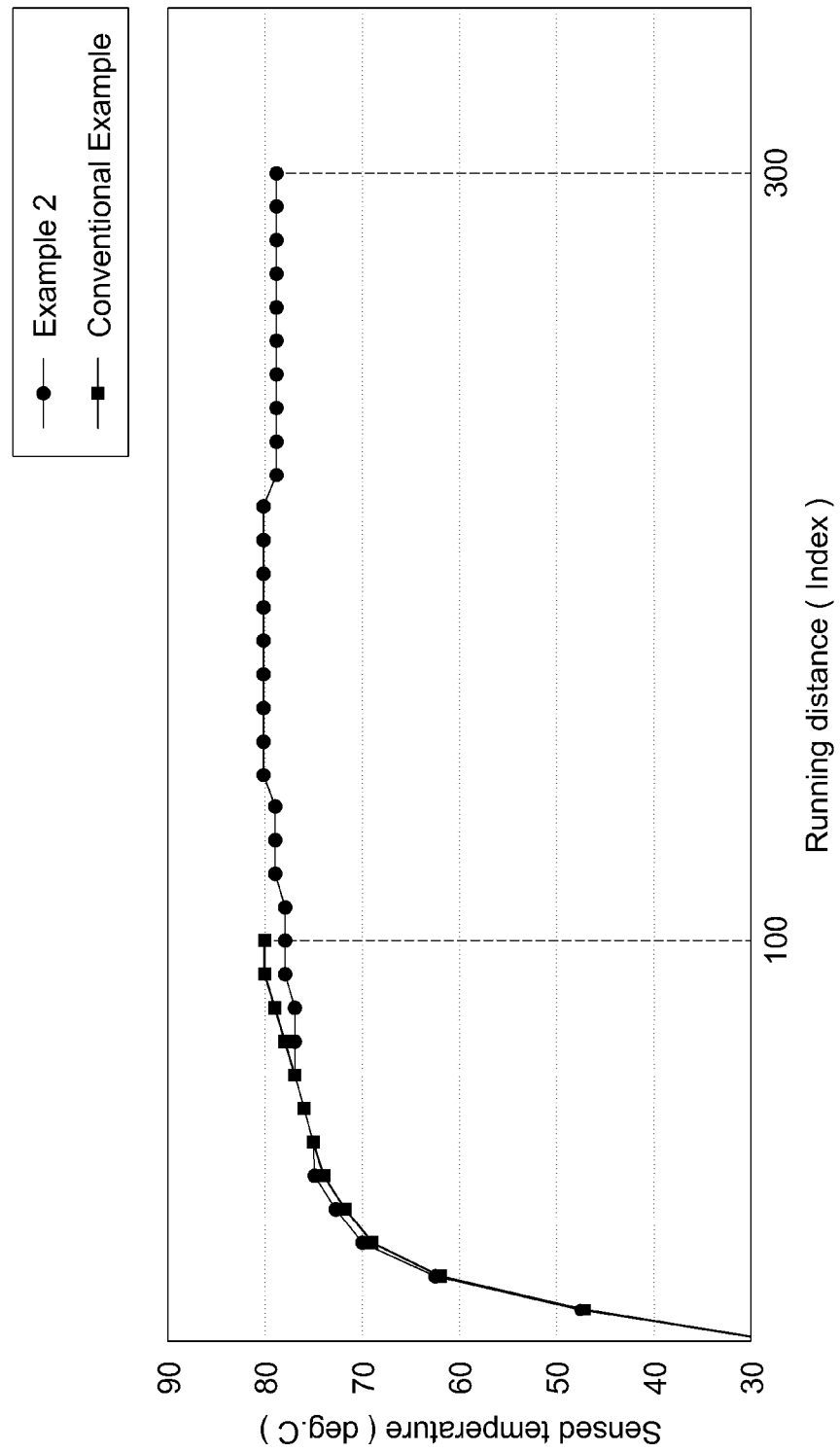
FIG. 13 A graph showing a relationship between a running distance index and a sensed temperature measured with a sensor according to Example 2.
Figure 14:
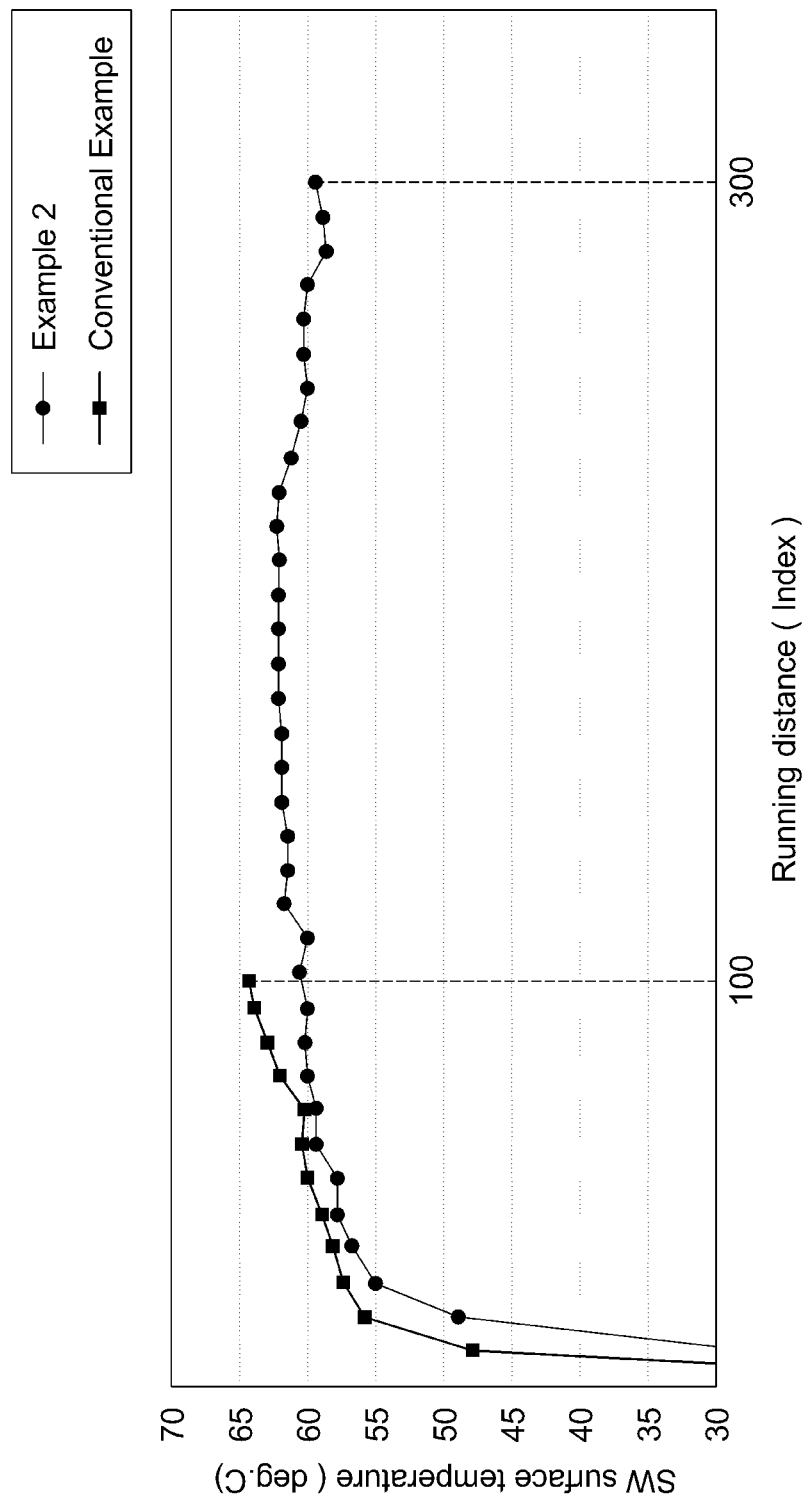
FIG. 14 A graph showing a relationship between a running distance index and a temperature of a sidewall portion according to Example 2.

The test results are shown in FIG. 13 and FIG. 14. FIG. 13 shows a relationship between an atmosphere temperature of the tire cavity determined by the temperature sensor arranged near the air valve and the run-flat running distance index which evaluation is displayed using indices with the conventional run-flat running distance being 100. And, FIG. 14 shows a relationship between a surface temperature of the sidewall portion (measured by a non-contact type infrared radiation sensor) and the running distance index.

As the result of the tests, it was expressly confirmed an increase in temperature during run-flat running in the vehicle according to Example 2. In the vehicle according to conventional Example, the pneumatic tire of the front-right wheel blew out at a certain running distance. However, the vehicle of Example 2 had no destruction although it ran three times the run-flat running distance of Referenced Example.

The invention claimed is:

1. A vehicle having pneumatic tires and a cooling unit which comprises:
    a duct having at one end an air intake port which takes in air and having at the other end a nozzle which expels the air toward a braking device; and
    a changeover device which expels at least a part of the air flowing through said duct toward the pneumatic tire when the air pressure of the pneumatic tire decreases.

2. The vehicle as set forth in claim 1, wherein said pneumatic tires are run flat tires which each have a sidewall portion provided with a side reinforcing rubber layer having a substantially crescent cross-sectional shape.

3. The vehicle as set forth in claim 1 or 2, wherein the air is expelled toward a sidewall portion and/or a tread portion of the pneumatic tire.

4. The vehicle as set forth in claim 1, wherein the air is expelled toward a sidewall portion and/or a tread portion located inside the tire equator with respect to the vehicle.

* * * * *